No. 783,278. PATENTED FEB. 21, 1905.
A. G. HUNTER.
WRENCH.
APPLICATION FILED NOV. 17, 1904.
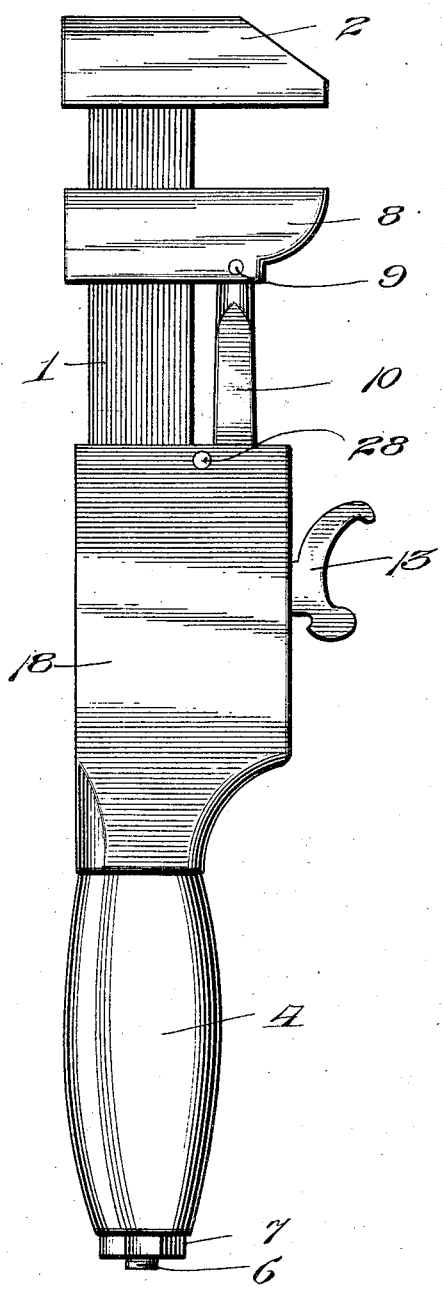
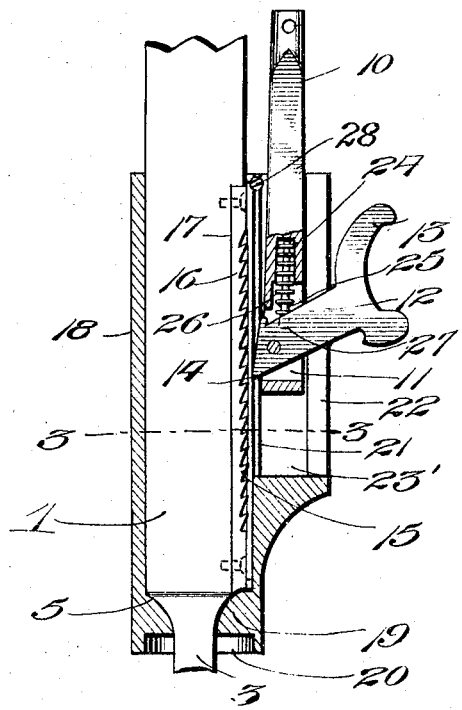
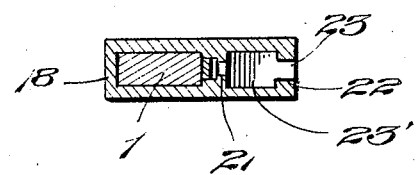
Witnesses
Phil. E. Barnes
F. S. Elmore
Inventor
Arthur G. Hunter
By Victor J. Evans
Attorney No. 783,278.

Patented February 21, 1905.

UNITED STATES PATENT OFFICE.

ARTHUR G. HUNTER, OF ELMVIEW, TEXAS.

WRENCH.

SPECIFICATION forming part of Letters Patent No. 783,278, dated February 21, 1905.

Application filed November 17, 1904. Serial No. 233,192.

*To all whom it may concern:*

Be it known that I, ARTHUR G. HUNTER, a citizen of the United States, residing at Elmview, in the county of Grayson and State of Texas, have invented new and useful Improvements in Wrenches, of which the following is a specification.

This invention relates to wrenches, and has for its objects to produce a simple inexpensive device of this character which may be readily manipulated with one hand and accurately adjusted to the desired size and one wherein the movable jaw after adjustment will be securely locked against movement.

A further object of the invention is to provide a wrench wherein the parts may be readily disconnected to permit of new parts being substituted for those that become worn and one wherein the movable jaw and its locking member will be guided in their movements.

With these and other objects in view the invention comprises the novel features of construction and combination of parts more fully hereinafter described.

In the accompanying drawings, Figure 1 is a side elevation of a wrench embodying the invention. Fig. 2 is a detail longitudinal section centrally through the sleeve or casing and adjacent parts. Fig. 3 is a cross-section taken on the line 3 3 of Fig. 2.

Referring to the drawings, 1 designates a bar or shank carrying at its forward end a fixed head or jaw 2 and having a rear reduced portion 3 adapted for the reception of a handle 4, there being formed at the juncture of the shank and its reduced portion 3 a shoulder 5 for a purpose which will hereinafter appear, the terminal of the portion 3 being threaded, as at 6, for the reception of a fastening member or nut 7, which bears upon the rear end of the handle 4 to secure the latter in place.

Arranged for sliding movement longitudinally of the shank 1 is a movable jaw 8, adapted to coöperate with the jaw 2 for engaging a nut or other body, there being pivotally connected to the jaw 8 by means of a pintle 9 the forward end of a rigid element or link 10, provided at its rear end with a longitudinally-disposed slot 11, in which is pivoted a locking member or dog 12. The dog 12 is provided at its outer end with a substantially C-shaped thumb-piece 13 and has its inner end beveled or inclined to produce an engaging portion or tooth 14, adapted for interlocking engagement with teeth 15, provided on a bar or plate 16, seated and secured within a recess 17, formed within the adjacent longitudinal edge of the shank 1. Attention is directed to the fact that the teeth on the bar 15 are spaced in the direction of the length of the shank and that owing to the bar 16 being seated in the recess the outer ends of the teeth are in a plane common to that of the adjacent edge of the shank.

Seated upon the shank 1 is a tubular sleeve or casing 18, having a longitudinal opening for the reception of the shank and provided at the rear end of said opening with an internal collar or abutment 19, adapted to contact with the shoulder 5 for fixing the casing against forward movement upon the shank, there being formed at the rear terminal of the casing a socket or recess 20, in which the forward end of the handle 4 seats, whereby when the nut 7 is in position the sleeve will be fixed against rearward movement on the shank. The sleeve, which is of greater width than the shank, is provided on the inner faces of its side walls with opposed longitudinal ribs or flanges 21, adapted for engagement with the adjacent edge of the shank, and, further, with longitudinal ribs or flanges 22, projecting inward from the side walls of the casing at the outer edges of the latter, thus to produce a longitudinal slot or guideway 23 for the reception of the locking member 12. The outer flanges 22 are appropriately spaced from the inner flanges 21 in a direction transversely of the casing 18 and, as illustrated in Fig. 3, produce a chamber 23', extending longitudinally of the casing for the reception of the link 10 during its longitudinal movements for actuating the jaw 8.

The link 10 has formed therein an internal longitudinally-extending socket 24 for the reception of a plunger 25, on which is disposed a pressure-spring 26, adapted for moving the locking member 12 to engaging position, the rear end of the plunger 25 being seated in a suitable socket formed in the locking member, as seen at 27 in Fig. 2.

The side walls of the casing 18 are connected at the forward end of the latter by means of a connecting element or rivet 28, which is disposed between the adjacent edge of the shank 1 and the link 10, thus serving to maintain the parts in proper spaced relation and afford a bearing for the link during its movements.

In practice the operator grasps the handle 4 and places his thumb upon the head 13 of the locking member for manipulating the latter. A slight forward movement of the outer or headed end of the member serves to release the teeth 14 from the toothed bar 15, whereupon the jaw 8 may through the medium of the locking member and link 10 be moved readily back and forth, as desired, upon the shank 1, thus adjusting the movable jaw relative to the jaw 2. After the desired adjustment has been obtained the member 12 is released, and the spring 26 acts to throw the tooth 14 automatically into engagement with one of the teeth upon the bar 16, thereby locking the jaw 8 against further rearward movement.

It is to be particularly noted that the guideway 23 between the flanges 22 is of a width equaling that of the bar 16 and that the locking member 12 is of a corresponding thickness, whereby a secure engagement of the tooth 14 with the teeth 15 is afforded, and, furthermore, that by the removal of the nut 7 the parts of the wrench may be readily disconnected to permit of the substitution of a new part for any one that has become worn or otherwise defective.

From the foregoing it is apparent that I produce a simple device admirably adapted for the attainment of the ends in view, it being understood that minor changes in the details herein set forth may be resorted to without departing from the spirit of the invention.

Having thus fully described the invention, what is claimed as new is—

1. In a wrench, a shank having a fixed jaw, a movable jaw slidably disposed upon the shank, a sleeve seated on the shank and provided with a longitudinal chamber and a guideway communicating with said chamber, a link connected with the movable jaw and adapted for entrance into and movement longitudinally of the chamber, and a locking member carried by the link, said member being movably disposed within the guideway and designed for engagement with the shank to fix the movable jaw against movement.

2. In a wrench, a shank carrying a fixed jaw and provided with a series of teeth, a movable jaw slidably disposed upon the shank, a link connected with the movable jaw, a sleeve mounted upon the shank and having a longitudinal chamber for the reception of the link, and a guideway communicating with the chamber, a locking member carried by the link, said member being arranged for movement in the guideway and adapted for engagement with the teeth on the shank to lock the movable jaw against movement, and a spring acting on the locking member to maintain the latter in engaging position.

3. In a wrench, a shank carrying a fixed jaw and provided with a series of teeth and a reduced portion forming a shoulder, a movable jaw slidably disposed upon the shank, a link connected with the movable jaw, a sleeve seated upon the shank and having an internal abutment adapted for engagement with the shoulder, said sleeve being provided with a longitudinal chamber for the reception of the link and a guideway communicating with the chamber, a locking member carried by the link and formed for engagement with the teeth on the shank to lock the movable jaw against movement, a handle disposed upon the reduced portion of the shank and bearing at its forward end against the rear end of the sleeve, and a fastening member engaging the shank at the rear end of the handle.

In testimony whereof I affix my signature in presence of two witnesses.

ARTHUR G. HUNTER.

Witnesses:
JOHN R. DAVIS,
SYLVANUS A. SCHOTT.